United States Patent
Akami

(10) Patent No.: US 8,308,599 B2
(45) Date of Patent: Nov. 13, 2012

(54) ECCENTRIC SPEED REDUCER

(75) Inventor: Toshiya Akami, Gifu (JP)

(73) Assignee: Nabtesco Corporation (JP)

( * ) Notice: Subject to any disclaimer, the term of this patent is extended or adjusted under 35 U.S.C. 154(b) by 277 days.

(21) Appl. No.: 12/865,049

(22) PCT Filed: Feb. 13, 2008

(86) PCT No.: PCT/JP2008/000216
§ 371 (c)(1),
(2), (4) Date: Jul. 28, 2010

(87) PCT Pub. No.: WO2009/101654
PCT Pub. Date: Aug. 20, 2009

(65) Prior Publication Data
US 2011/0015023 A1    Jan. 20, 2011

(51) Int. Cl.
*F16H 1/32* (2006.01)
(52) U.S. Cl. .................... 475/178; 475/179
(58) Field of Classification Search .................. 475/162, 475/178, 179
See application file for complete search history.

(56) References Cited

U.S. PATENT DOCUMENTS

2008/0139357 A1* 6/2008 Fujimoto .................. 475/178
2008/0176701 A1* 7/2008 Yamamoto et al. .......... 475/178

FOREIGN PATENT DOCUMENTS

| EP | 1 767 815 A2 | 3/2007 |
|---|---|---|
| JP | 63-270946 A | 11/1988 |
| JP | 2003-083400 A | 3/2003 |
| JP | 2005-061519 A | 3/2005 |
| JP | 2007-196980 A | 8/2007 |
| JP | 2007-232119 A | 9/2007 |

OTHER PUBLICATIONS

International Search Report; PCT/JP2008/000216; Mar. 25, 2008.
The Extended European Search Report dated Apr. 27, 2011; Application No. / Patent No. 08710370.1-1254 / 2241782 PCT/JP2008000216.

* cited by examiner

*Primary Examiner* — Edwin A Young
(74) *Attorney, Agent, or Firm* — Studebaker & Brackett PC; Donald R. Studebaker

(57) ABSTRACT

An eccentric speed reducer is provided with which it is possible to achieve improved output torque without increasing the outer radial dimension of the casing. A tapered side is formed on at least part of a peripheral side surface of struts 18, with the tapered side extending in a tapered manner in the longitudinal direction of the struts 18 in a direction that is oblique to a direction parallel to a center line P passing through a casing 14 so as to connect inner circumferential centers of the casing 14 and in which the struts 18 narrow toward an end carrier 17. A tapered side gradient that is the angle of a direction in which the tapered side extends relative to the direction parallel to the center line P is formed to be at least 3 degrees and at most 6 degrees.

4 Claims, 5 Drawing Sheets

ECCENTRIC SPEED REDUCER

TECHNICAL FIELD

The present invention relates to an eccentric speed reducer that includes crankshafts, external gears that eccentrically rotate by rotation of the crankshafts, a casing provided with internal teeth for meshing with external teeth of the external gears, and a carrier that rotatably supports the crankshafts.

BACKGROUND ART

In various industrial machines and the like, eccentric speed reducers are used as speed reducers capable of achieving a high speed reduction ratio. Such eccentric speed reducers include crankshafts, external gears that eccentrically rotate by rotation of the crankshafts, a casing provided with internal teeth for meshing with external teeth of the external gears, and a carrier that rotatably supports the crankshafts, and an eccentric speed reducer as described in Patent Document 1 is known. In the eccentric speed reducer described in Patent Document 1, a carrier that rotatably supports a plurality of crankshafts is made up of a base carrier (base portion) that rotatably supports one end of each of the crankshafts and an end carrier (end plate portion) that rotatably supports the other end. The base carrier is integrally formed with a plurality of struts (column portions) extending substantially straight from the base carrier toward the end carrier and connecting the base carrier and the end carrier.

Patent Document 1: JP 2003-083400A (page 3, FIG. 1, FIG. 2)

DISCLOSURE OF INVENTION

Problem to be Solved by the Invention

It is desirable for eccentric speed reducers to have a small size and to be able to achieve a high output, and there is a need to achieve improved output torque without increasing the outer radial dimension of the casing (the outer dimension of the casing in the radial direction with respect to the inner circumference of the casing). Also, in order to achieve improved output torque (increased output), it is necessary to improve the strength of each of the struts that connects the base carrier and the end carrier that rotatably support the crankshafts. However, since each of the struts is disposed so as to penetrate through a hole formed in the external gear provided with the external teeth for meshing with the internal teeth on the inner circumference of the casing, it is necessary that each of the struts is disposed further outside in the radial direction of the casing in order to improve the strength of each of the struts based on the structure disclosed in Patent Document 1. For this reason, the eccentric speed reducer described in Patent Document 1 has a problem in that the strength of the struts is limited depending on the radial dimension of the casing, so it is difficult to achieve improved output torque without increasing the radial dimension of the casing.

In view of the foregoing circumstances, it is an object of the present invention to provide an eccentric speed reducer with which it is possible to achieve improved output torque without increasing the outer radial dimension of the casing.

Means for Solving Problem

An eccentric speed reducer according to a first aspect of the present invention includes: a casing having internal teeth provided on an inner circumference thereof; an external gear housed in the casing and having external teeth provided on an outer circumference thereof for meshing with the internal teeth; a plurality of crankshafts passing through holes formed in the external gear and disposed in a circumferential direction along the inner circumference of the casing, the crankshafts rotating to allow the external gear to eccentrically rotate; a base carrier that rotatably supports one end of the crankshafts; an end carrier that rotatably supports the other end of the crankshafts; and a plurality of struts disposed between the crankshafts in a circumferential direction along the inner circumference of the casing and formed integrally with the base carrier, the struts connecting the base carrier and the end carrier. Also, in the eccentric speed reducer of the first aspect of the present invention, a tapered side is formed on at least part of a peripheral side surface of the struts, the tapered side extending in a tapered manner in the longitudinal direction of the struts in a direction that is oblique to a direction parallel to a center line passing through the casing so as to connect inner circumferential centers of the casing and in which the struts narrow toward the end carrier, and a tapered side gradient that is the angle of a direction in which the tapered side extends relative to the direction parallel to the center line is at least 3 degrees and at most 6 degrees.

According to this aspect of the present invention, a tapered side is formed on the peripheral side surface of each of the struts, with the tapered side extending in a tapered manner in the longitudinal direction of the struts (a direction in which the struts extend from the base carrier toward the end carrier) in a direction that is oblique to a direction parallel to the center line connecting the inner circumferential centers of the casing and in which the struts narrow toward the end carrier (in a direction in which the cross-sectional area decreases in the longitudinal direction of the struts). Accordingly, a load that is exerted on the struts is distributed so as to disperse along the tapered side that changes in the direction in which the struts narrow toward the end carrier. That is, for a substantially straight strut, a partial unbalanced load tends to be exerted on the strut particularly on its basal side; however, providing the tapered side facilitates effective load dispersion over the longitudinal direction of the strut. Accordingly, the struts as a whole easily undergo elastic deformation (the struts as a whole become pliable), so it is possible to improve the critical strength of the struts. Furthermore, since it is possible to improve the strength of the struts by providing the struts with the tapered side, it is possible to improve the strength of the struts without increasing the radial size of the casing. As a result of verification by the inventors, it was confirmed that the load dispersion effect is likely to be reduced rapidly when the tapered side gradient is less than 3 degrees, whereas the strength of the struts at their tip (the side approaching the end carrier) is more likely to be decreased when the tapered side gradient exceeds 6 degrees. Accordingly, by setting the tapered side gradient to at least 3 degrees and at most 6 degrees, it is possible to achieve effective load dispersion, thereby maximizing the effect of increasing the strength of the struts as a whole.

Accordingly, the present invention can provide an eccentric speed reducer with which it is possible to achieve improved output torque without increasing the outer radial dimension of the casing.

An eccentric speed reducer according to a second aspect of the present invention is the eccentric speed reducer according to the first aspect of the present invention, wherein an outer circumference side is formed on the peripheral side surface of the struts, the outer circumference side being located outside in a radial direction with respect to the inner circumference of the casing and in a circumferential direction along the inner circumference of the casing, and extending in the longitudinal direction of the struts in a direction in which the struts narrow toward the end carrier or in a direction straight toward the end carrier. Also, in the eccentric speed reducer of the second aspect of the present invention, an outer circumference side gradient that is the angle of a direction in which the outer circumference side extends relative to the direction parallel to the center line is at least 0 degrees and less than 1 degree.

According to this aspect of the present invention, the outer circumference side of each of the struts is formed so as to have a small outer circumference side gradient of at least 0 degrees and less than 1 degree. Accordingly, also at the tip of the struts, the outer circumference side is disposed further outside in the radial direction of the casing (the radial direction with respect to the inner circumference of the casing) in a direction in which the struts narrow toward the end carrier or in a direction straight toward the end carrier. This makes it possible to efficiently secure the cross-sectional area of a cross section perpendicular to the longitudinal direction of the struts on the radial outside of the casing, also for a strut provided with tapered sides. Accordingly, providing the tapered side allows the struts as a whole to easily undergo elastic deformation to achieve improved strength, and also to efficiently increase the cross-sectional area of the struts, making it possible to achieve a further increase in the strength of the struts. Further, as a result of verification by the inventors, it was found that a decrease in strength due to a decrease in the cross-sectional area tends to occur when the outer circumference side gradient is 1 degree or greater.

With the configuration of the present invention, providing the tapered side makes it possible to maintain a configuration with which a force exerted in the circumferential direction of the casing (the circumferential direction along the inner circumference of the casing) is efficiently shared by the struts as a whole, and also to increase the cross-sectional area, thus improving the strength in cross sections in the longitudinal direction of the struts. On the other hand, a force exerted in the radial direction of the casing is relatively small compared to the force exerted in the circumferential direction of the casing, so there is no possibility that the struts will be damaged by a force exerted in the radial direction of the casing even when the outer circumference side gradient of the struts is set to at least 0 degrees and less than 1 degree.

An eccentric speed reducer according to a third aspect of the present invention is the eccentric speed reducer according to the first or second aspect of the present invention, wherein the base carrier is provided with rotation supporting holes that rotatably support one end of the crankshafts, the tapered side is formed in the struts at only a pair of bulging portions located so as to be outside in a radial direction with respect to the inner circumference of the casing and to bulge on both sides in a circumferential direction along the inner circumference of the casing or at only one of the pair of bulging portions. Also, in the eccentric speed reducer according to the third aspect of the present invention, in the bulging portions in which the tapered side is formed, at least a basal portion of the tapered side that is continuous with the base carrier is formed on the side of the rotation supporting hole facing the bulging portions with respect to a tangent that is in contact with a peripheral edge of the rotation supporting hole and that passes through the inner circumferential centers of the casing.

According to this aspect of the present invention, the tapered side is formed only at the bulging portions, which are the portions of the struts on which the force in the circumferential direction of the casing tends to be exerted. By providing such a tapered side, it is possible to efficiently disperse the load imposed on a portion where a load in the circumferential direction of the casing tends to be exerted, and also to minimize the decrease of the cross-sectional area of the struts that results from provision of the tapered side, thus also efficiently inhibiting the reduction of rigidity of the struts that changes depending on the cross-sectional area. Also, at least a basal portion of the tapered side is formed in a portion at the bulging portions of the struts where the force in the circumferential direction of the casing is more likely to be exerted, that is, a basal portion that is continuous with the base carrier on the side of the rotation supporting hole with respect to the tangent that is in contact in a bulging portion with the peripheral edge of the rotation supporting hole facing that bulging portion and that passes through the center of the casing. This enables even more efficient load dispersion in a region including portions where a load in the circumferential direction of the casing is most likely to be exerted. With these configurations, the present invention minimizes the effect on the strength of the struts by a decrease in the cross-sectional area, and also enables a force in the circumferential direction of the casing to be dispersed with the struts as a whole, thus allowing the struts as a whole to easily undergo elastic deformation; accordingly, it is possible to improve the strength of the struts even further.

Effects of the Invention

According to the present invention, it is possible to provide an eccentric speed reducer with which it is possible to achieve improved output torque without increasing the outer radial dimension of the casing.

DESCRIPTIONS OF REFERENCE NUMERALS

Figure 1:
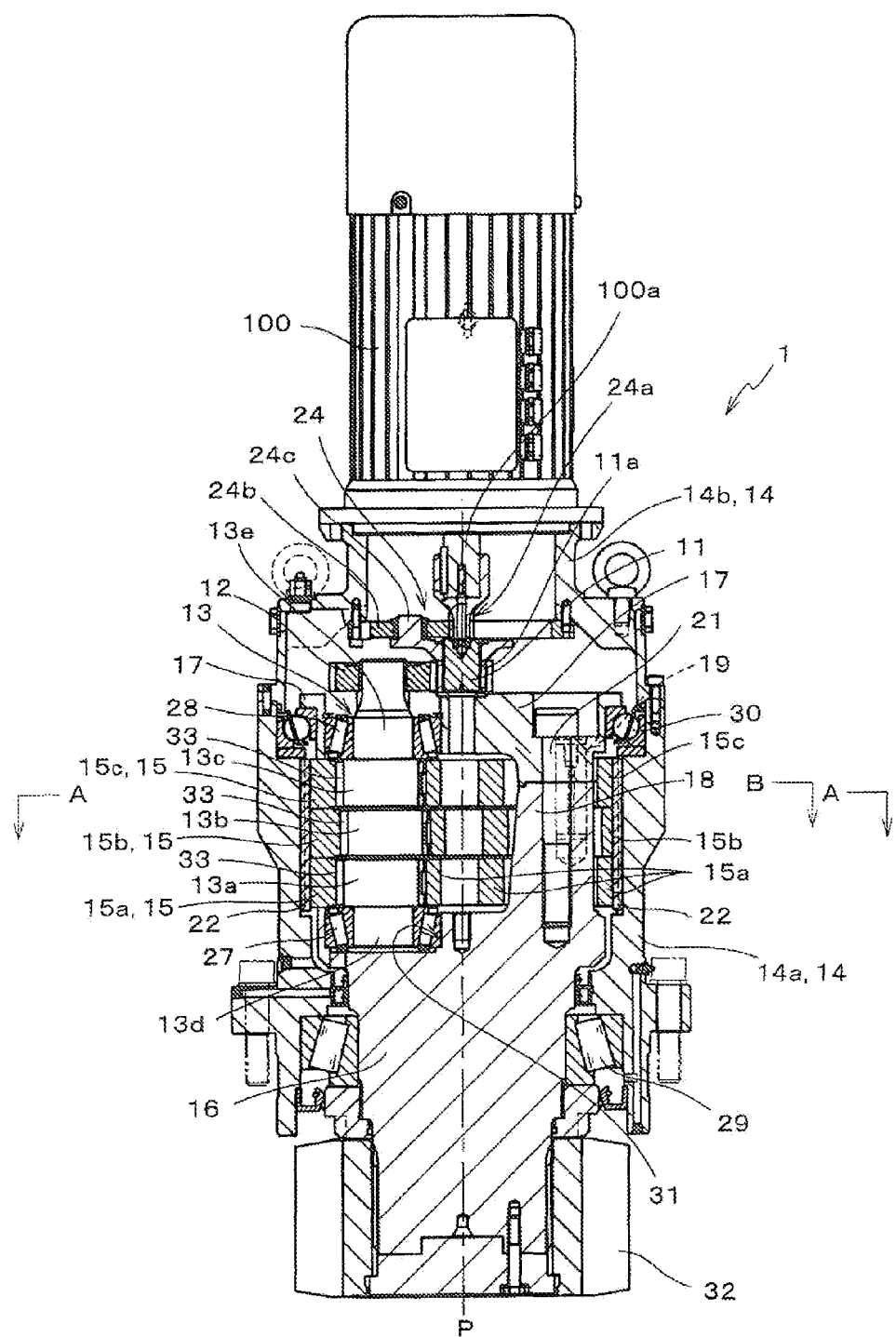
FIG. 1 is a cross-sectional view showing an eccentric speed reducer according to one embodiment of the present invention.

1 Eccentric speed reducer
13 Crankshaft
14 Casing
15 External gear
16 Base carrier
17 End carrier
18 Strut
22 Internal teeth
23 External teeth
35 Bulging portion side (Tapered side)

DESCRIPTION OF THE INVENTION

Hereinafter, an embodiment for carrying out the present invention will be described with reference to the drawings. An eccentric speed reducer according to an embodiment of the present invention is applicable widely in a variety of industrial machines such as industrial robots and various machine tools, and construction machines. For example, in windmills, with the recent trend that the diameter of blades is increasing, there is a need to provide a speed reducer having high output specifications (having a large load carrying capacity) while suppressing an increase in dimensions, as a yaw drive apparatus, which is an oscillating driving apparatus for rotating a windmill according to the wind direction. Accordingly, an eccentric speed reducer according to this embodiment is suitably used as such a yaw drive apparatus of a windmill. Furthermore, without being limited to this example, the present invention can be widely applied for an eccentric speed reducer that includes crankshafts, external gears that eccentrically rotate by rotation of the crankshafts, a casing provided with internal teeth for meshing with external teeth of the external gears, and a carrier that rotatably supports the crankshafts.

FIG. 1 is a cross-sectional view showing an eccentric speed reducer 1 according to one embodiment of the present invention. The eccentric speed reducer 1 is used, for example, as a yaw drive apparatus of a windmill, and reduces rotation that is input from a motor 100 disposed on the upper side, and transmits and outputs the reduced rotation, as shown in FIG. 1. The eccentric speed reducer 1 includes an input shaft 11, spur gears 12, crankshafts 13, a casing 14, external gears 15, a base carrier 16, an end carrier 17, struts 18, pin members (19, 20) (see FIG. 2), bolt members 21, and so forth.

Figure 2:
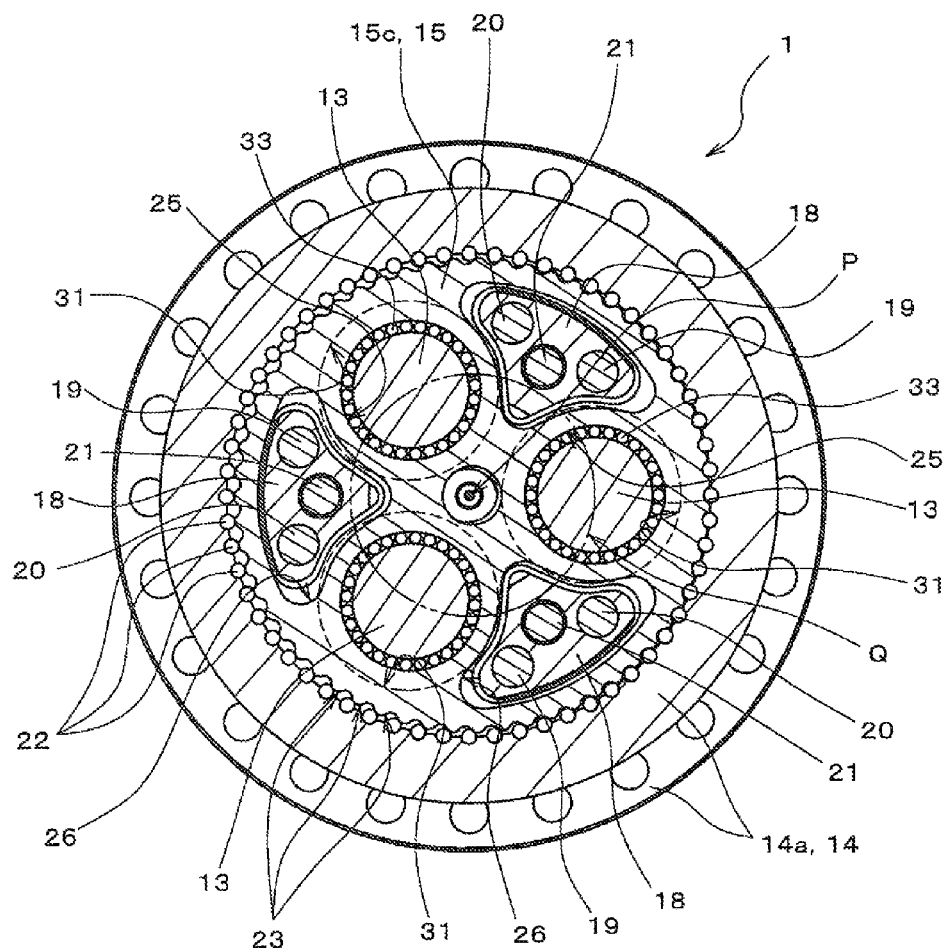
FIG. 2 is a cross-sectional view as viewed in the direction of arrows A-A in FIG. 1.

The casing 14 is made up of a first casing portion 14a and a second casing portion 14b that are tubular, and the edges thereof are connected to each other with bolts. Also, the input shaft 11, the spur gears 12, the crankshafts 13, the external gears 15, part of the base carrier 16, the end carrier 17, and so forth, are housed inside the casing 14. An opening is formed at one end serving as the output end (the end of the first casing portion 14a) of the casing 14, and the motor 100 is fixed at the other end serving as the input end (the end of the second casing portion 14b). As shown in FIG. 1 and FIG. 2, which is a cross-sectional view as viewed in the direction of arrows A-A in FIG. 1, the casing 14 has internal teeth 22 provided on its inner circumference. The internal teeth 22 are formed as pin-shaped members (round-bar-shaped members) for meshing with below-described external teeth 23 provided on the external gear 15. The internal teeth 22 are arranged on the inner circumference of the casing 14 in equal pitches in a state in which they are fitted into the casing 14.

The input shaft 11 is provided such that rotational driving force from a motor output shaft 100a of the motor 100 is input via a planetary gear mechanism 24 and is linked to the motor 100. That is, sun gears 24a of the planetary gear mechanism 24 are connected to the motor output shaft 100a protruding from the motor 100 attached to the other end of the casing 14 into the casing 14. Also, the input shaft 11 is connected by spline coupling to the inner circumference portion of a planet carrier 24c that rotatably supports a plurality of planet gears 24b for meshing with the sun gears 24a and moves in a revolving manner. Thus, rotational driving force from the motor 100 is reduced via the planetary gear mechanism 24 and transmitted to the input shaft 11. Furthermore, the input shaft 11 is disposed at the center in the radial direction with respect to the inner circumference of the casing 14 (hereinafter, referred to as "the radial direction of the casing 14"), and a ring gear 11a is connected by spline coupling to the outer circumference on one end of the input shaft 11 that is opposite from the other end (the motor 100 side) on which the input shaft 11 is connected by spline coupling to the planet carrier 24b.

A plurality of (three, in this embodiment) spur gears 12 are arranged around the input shaft 11 and in the circumferential direction thereof. Each of the spur gears 12 is configured to mesh with the ring gear 11a coupled to the input shaft 11. Consequently, rotational driving force from the motor 100 causes the input shaft 11 to rotate, and this rotation causes the spur gear 12 to be rotationally driven.

The spur gear 12 is fixed to the crankshaft 13 at an end of the crankshaft 3 that is on the motor 100 side, and the crankshaft 3 is provided as a member for eccentrically rotating a below-described external gear 15 by rotating along with the spur gear 12. Also, as shown in FIGS. 1 and 2, a plurality of (in this embodiment, three) crankshafts 13 are disposed such that they each pass through a crankshaft hole 25 formed in the external gear 15 and also extend parallel to the input shaft 11 in the circumferential direction along the inner circumference of the casing 14. That is, as clearly shown in FIG. 2, the three crankshafts 13 are disposed in the circumferential direction of a predetermined circle Q (indicated by chain double-dashed line in FIG. 2) centering on a casing center P (indicated by the dots in FIG. 2), which is the center of the inner circumference of the casing 14. In FIG. 1, the casing center P is indicated by alternate long and short dashed lines as the center line P passing through the casing 14 so as to connect inner circumferential centers of the casing 14.

Further, as clearly shown in FIG. 1, each of the crankshafts 13 includes a first cam portion 13a, a second cam portion 13b, a third cam portion 13c, a first shaft portion 13d, and a second shaft portion 13e. The first shaft portion 13d, the first cam portion 13a, the second cam portion 13b, the third cam portion 13c, and the second shaft portion 13e are provided in series in this order. The first to third cam portions (13a to 13c) are formed such that their cross section perpendicular to the axial direction is a circular cross section, and provided such that the location of their centers is eccentric with respect to the shaft center of the crankshaft 13 (the location of the centers of the first shaft portion 13d and the second shaft portion 13e). Further, the first shaft portion 13d is rotatably supported with respect to a below-described base carrier 16 via a roller bearing 27, and the second shaft portion 13e is rotatably supported with respect to a below-described end carrier 17 via a roller bearing 28. In addition, each of the spur gears 12 is attached by spline coupling to an end portion of the second shaft portion B 13e of each of the crankshafts 13.

As clearly shown in FIG. 1, the base carrier 16 is disposed in a state in which one end serving as the output end protrudes from the opening of the casing 14, and an output gear 32 is attached to that end. Further, the base carrier 16 is housed in the casing 14 in a state in which its other end is connected to the end carrier 17 via the struts 18, the pin members (19, 20) and the bolt members 21, and, in this state, constitutes the output shaft of the eccentric speed reducer 1. Also, the output shaft including the base carrier 16 and the end carrier 17 is rotatably supported with respect to the casing 14 via a roller bearing 29 on the output side and a ball bearing 30 on the motor 100 side that are arranged along the inner circumference of the casing 14. Further, the base carrier 16 is provided with rotation supporting holes 31 that rotationally supports one end of each of the crankshafts 13 at the first shaft portion 13d via the roller bearing 27. In FIG. 2, the rotation supporting holes 31 are indicated by broken lines.

Further, the end carrier 17 connected at the other end of the base carrier 16 is provided as a disc-shaped member, and has a through-hole through which the second shaft portion 13e of the crankshaft 13 passes. In this through-hole, the end carrier 17 rotatably supports the other end of the crankshaft 13 at the second shaft portion 13e via the roller bearing 28.

As shown in FIGS. 1 and 2, the external gears 15 include a first external gear 15a, a second external gear 15b, and a third external gear 15c that are housed in the casing 14 in a state in which they are stacked parallel to one another. The crankshaft holes 25 through which the crankshafts 13 pass and below-described strut holes 26 through which the struts 18 pass are formed in each of the first to third external gears (15a to 15c). The first to third external gears (15a to 15c) are disposed such that, in a direction parallel to the axial direction of the input shaft 11 (i.e., the direction in which the center line P extends), the positions of the crankshaft holes 25 correspond to one another and the positions of the strut holes 26 correspond to one another. The crankshaft holes 25 are each formed as a circular hole, and three crankshaft holes 25 respectively corresponding to the crankshafts 13 are formed at an equal angle in the circumferential direction of the external gears 15. Each of the crankshaft holes 25 supports, via a needle bearing 33, the first cam portion 13a at the first external gear 15a, the second cam portion 13b at the second external gear 15b, and the third cam portion 13c at the third external gear 15c. The strut holes 26 are each formed as a hole having a triangular cross section and whose inner peripheral walls are formed with arc surfaces, and three strut holes 26 respectively corresponding to the struts 18 are formed at an equal angle in the circumferential direction of the external gears 15. That is, the strut holes 26 are formed in an alternating manner in the circumferential direction of the crankshaft holes 25 and the external gears 15. The struts 18 respectively pass through the strut holes 26 in a loosely fitted state.

Due to the above-described arrangement of the external gears 15 and the crankshafts 13, when the crankshafts 13 are rotated by rotational driving force transmitted from the input shaft 11 via the spur gears 12, a load is exerted from the first to third cam portions (13a to 13c) to the external gears 15 as the crankshafts 13 are rotated. This load will cause the external gears 15 (the first external gear 15a, the second external gear 15b, and the third external gear 15c) to oscillate.

Further, external teeth 23 for meshing with the internal teeth 22 are provided on the outer circumference of each of the first external gear 15a, the second external gear 15b, and the third external gear 15c. The external gears 15 (15a to 15c) are provided such that the number of the external teeth 23 is one less than the number of the internal teeth 22. Accordingly, each time the crankshafts 13 are rotated, the meshing of the external teeth 23 and the internal teeth 22 is shifted, which causes the external gears 15 (the first external gear 15a, the second external gear 15b, the third external gear 15c) to be eccentric and to rotate in oscillation.

Figure 3:
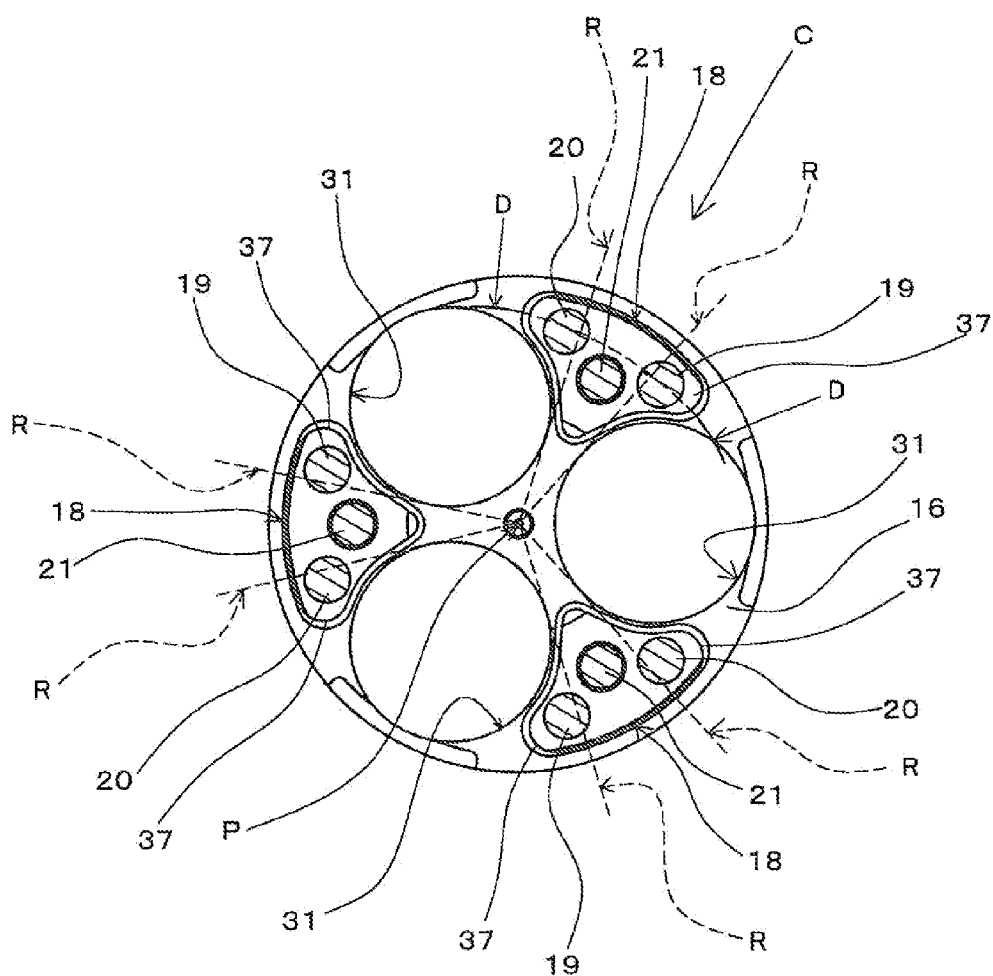
FIG. 3 is a diagram showing a base carrier and struts in the eccentric speed reducer shown in FIG. 1 as viewed from the position of arrow B in FIG. 1.

Following is a detailed description of the configuration of the struts 18. FIG. 3 is a diagram showing the base carrier 16 and the struts 18 together with a cross sectional view of the pin members (19, 20) and the bolt members 21, as viewed from the position of arrow B in FIG. 1. As shown in FIGS. 1 to 3, each of the struts 18 is disposed between the crankshafts 13 in the circumferential direction along the inner circumference of the casing 14 (the circumferential direction of the circle Q shown in FIG. 2). Also, a plurality of (in this embodiment, three) struts 18 are disposed at an equal angle in the circumferential direction along the inner circumference of the casing 14. Each of the struts 18 are formed integrally with the base carrier 16, and provided so as to protrude toward the other end of the base carrier 16 (the motor 100 side). The base carrier 16 and the end carrier 17 are connected via these struts 18.

Figure 4:
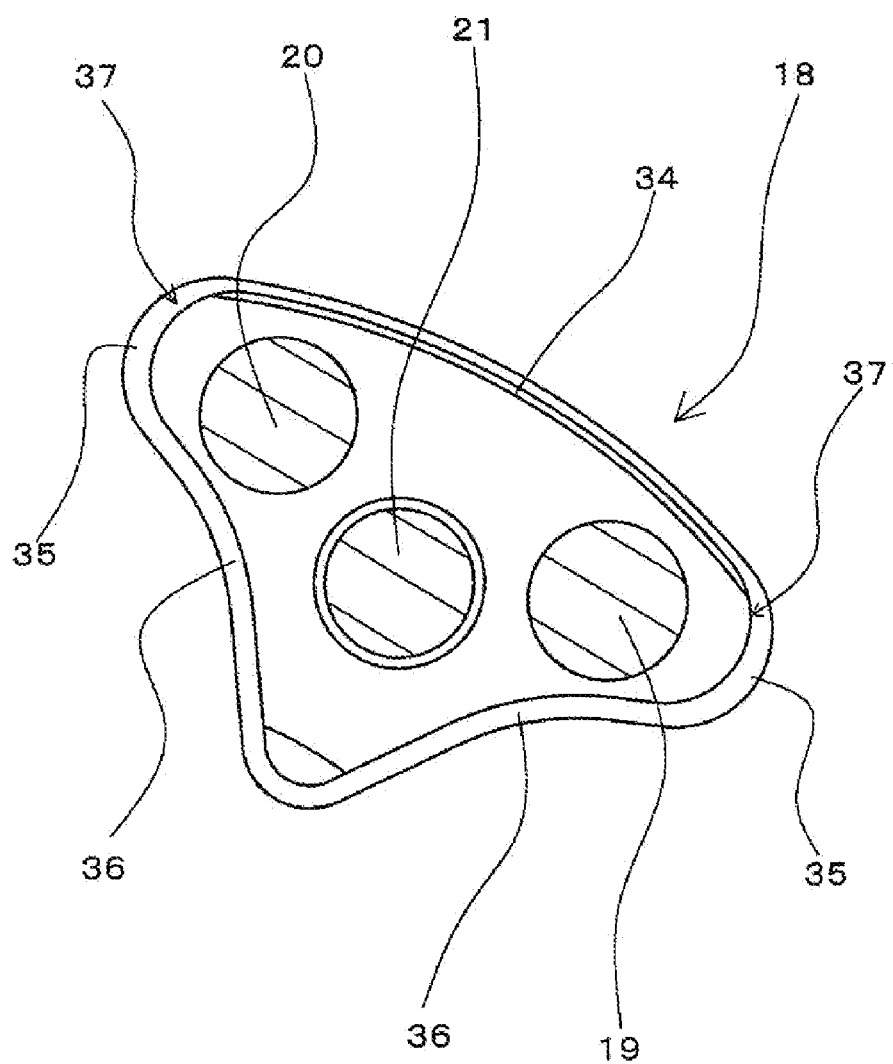
FIG. 4 is an enlarged view of the struts shown in FIG. 3.

As shown in FIGS. 1 to 3, the struts 18 are each formed so as to have a triangular cross section in which a peripheral side surface is formed by circular arc-shaped sides with a large radius of curvature being continuous via a circular arc-shaped side with a small radius of curvature in a cross section perpendicular to the longitudinal direction of the struts 18 (the direction in which the struts 18 extend from the base carrier 16 toward the end carrier 17). FIG. 4 is a diagram showing an enlarged view of only one of the struts 18 shown in FIG. 3. As clearly shown in FIG. 4, an outer circumference side 34, bulging portion sides 35, and supporting hole-facing sides 36 are formed on the peripheral side surface of the strut 18.

As clearly shown in FIGS. 3 and 4, the outer circumference side 34 is formed such that it is located outside in the radial direction of the casing 14 in each of the struts 18 and in the circumferential direction along the inner circumference of the casing 14, and that it extends in the longitudinal direction of the strut 18 in the direction in which the strut 18 narrows toward the end carrier 17 (in the direction in which the cross-sectional area decreases in the longitudinal direction of the strut 18). That is, the outer circumference side 34 in this case extends in a direction tilted toward the casing center P side, thus extending in the direction in which the strut 18 narrows. Also, the outer circumference side 34 is formed such that an outer circumference side gradient that is the angle of a direction in which the outer circumference side 34 extends relative to the direction parallel to the center line P (see FIG. 1) is at least 0 degrees and less than 1 degree, for example, 0.5 degrees. When the outer circumference side gradient is set to 0 degrees, the outer circumference side 34 will be formed so as to extend in the longitudinal direction of the strut 18 in a direction straight toward the end carrier 17 (in a direction parallel to the center line P).

Figure 5:
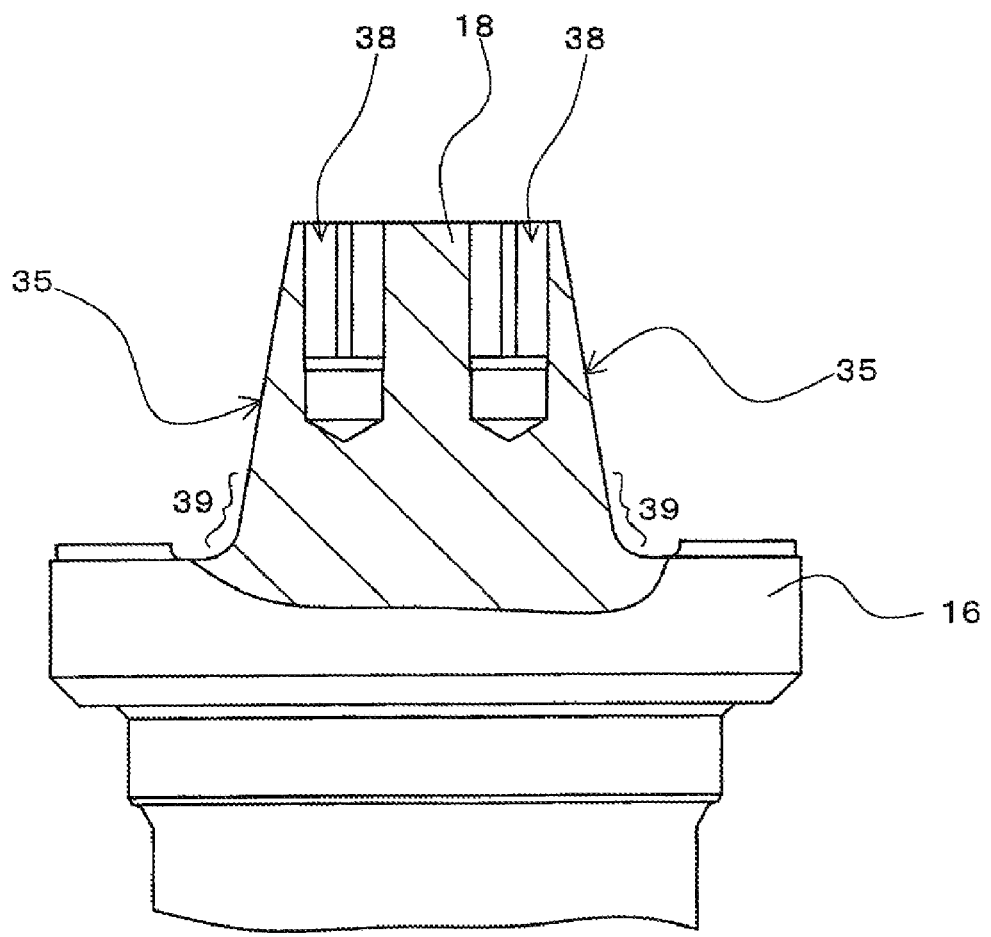
FIG. 5 is a diagram including a partially cut-out cross-sectional view of the base carrier and the strut shown in FIG. 3 as viewed in the direction of arrow C in FIG. C.

As clearly shown in FIGS. 3 and 4, the bulging portion sides 35 are formed in each of the struts 18 as sides of a pair of bulging portions 37 that are located so as to be outside in the radial direction of the casing 14 and to bulge on both sides in the circumferential direction along the inner circumference of the casing 14. FIG. 5 is a diagram showing the base carrier 16 and the strut 18 shown in FIG. 3 as viewed from the direction of arrow C, and shows the strut 18 in a partially cut-out cross-sectional view. In FIG. 5, only one strut 18 is illustrated and the other struts 18 are omitted, and the illustrated strut 18 is shown as a cross section as viewed from the position of arrows D-D, which is a cross section in the circumferential direction along the inner circumference of the casing 14. Further, a state in which the pin members (19, 20) are not disposed in pin holes 38 is shown. As shown in FIGS. 3 to 5, the bulging portion sides 35 are formed as tapered sides extending in a tapered manner in the longitudinal direction of the strut 18 in a direction that is oblique to the direction parallel to the center line P and in which the strut 18 narrows toward the end carrier 17 (in the direction in which the cross-sectional area decreases in the longitudinal direction of the strut 18). That is, the bulging portion sides 35 in this case extend in a direction tilted to the inside of the strut 18 in the circumferential direction along the inner circumference of the casing 14, thus extending in the direction in which the strut 18 narrows. Also, the bulging portion sides 35 serving as tapered sides are formed such that a tapered side gradient that is the angle of a direction in which these bulging portion sides 35 extend relative to the direction parallel to the center line P is at least 3 degrees and at most 6 degrees, for example, 5 degrees.

In the strut 18 of this embodiment, the tapered side having a tapered side gradient of at least 3 degrees and at most 6 degrees is formed only at the bulging portions 37. Also, in each of the bulging portions 37 at which the tapered side is formed, a basal portion 39 (see FIG. 5) of the tapered side that is continuous with the base carrier 16 is formed on the side of the rotation supporting hole 31 facing each of the bulging portions 37 with respect to a tangent R (indicated by a broken line in FIG. 3) that is in contact with a peripheral edge of the rotation supporting hole 31 and that passes through the casing center P.

As clearly shown in FIGS. 3 and 4, the supporting hole-facing sides 36 are each formed at a position facing the rotation supporting hole 31 in each of the struts 18, and provided in the longitudinal direction of the strut 18 as a side formed so as to have a circular arc shape following the rotation supporting hole 31 and to be recessed toward the inside of the strut 18. The supporting hole-facing sides 36 are formed such that a supporting hole-facing side gradient that is the angle of a direction in which the supporting hole-facing sides 36 extend relative to the direction parallel to the center line P is at least 1 degree and less than 3 degrees, for example, 2 degrees. Although the outer circumference side gradient, the tapered side gradient of the bulging portion sides 35, and the supporting hole-facing side gradient described above are all different angles, the portion where the outer circumference side 34 and the bulging portion side 35 are continuous and the portion where the bulging portion side 35 and the supporting hole-facing side 36 are continuous are formed such that the angle changes smoothly in these portions.

As shown in FIGS. 1 to 3, the pin members (19, 20) and the bolt members 21 are each provided as a connection member for connecting the base carrier 16 and the end carrier 17 when a portion in the axial direction is disposed in the strut 18. One end of each of the pin members (19, 20) is inserted into a hole formed in the strut 18, and the other end is inserted into a hole formed in the end carrier 17, both in a fitted state. On the other hand, the bolt members 21 are each disposed such that a bolt shaft portion of the bolt members 21 passes through the through-hole formed in the end carrier 17 and a bolt head portion of the bolt members 21 locks against the end carrier 17. Also, the bolt members 21 are each configured to screw, at an external thread portion at its tip, to a screw hole that is formed in the strut 18 and has an internal thread portion provided on the inner circumference, thereby coupling the base carrier 17 and the end carrier 18 together.

In the eccentric speed reducer 1 having the above-described configuration, when the motor output shaft 100a rotates and rotational driving force from the motor 100 is transmitted via the planetary gear mechanism 24 to the input shaft 11, the input shaft 11 rotates and the plurality of spur gears 12 meshing with the ring gears 11a rotate. The plurality of crankshaft 13 rotate with the rotation of the spur gears 12, and the first cam portion 13a, the second cam portion 13b, and the third cam portion 13c rotate along with the crankshafts 13. With this rotation, the first external gear 15a, the second external gear 15b, and the third external gear 15c eccentrically rotate, while shifting the meshing with the internal teeth 22, as described above. Also, with the eccentric rotation of the first to third external gears (15a to 15c), the crankshafts 13 that are rotatably held by the needle bearing 33 moves in a revolving manner around the casing center P. This causes rotation of the output shaft that includes the base carrier 16 and the end carrier 17 connected by the struts 18 in which the tapered sides are formed and that rotatably supports the crankshafts 13, whereby large torque is output from the output gear 32.

With the eccentric speed reducer 1 described above, a tapered side is formed as the bulging portion sides 35 on the peripheral side surface of each of the struts 18, with the tapered side extending in a tapered manner in the longitudinal direction of the struts 18 in a direction that is oblique to a direction parallel to the center line P connecting the inner circumferential centers of the casing 14 and in which the struts 18 narrow toward the end carrier 17. Accordingly, a load that is exerted on the struts 18 is distributed so as to disperse along the bulging portion sides 35 serving as the tapered sides that change in the direction in which the struts 18 narrow toward the end carrier 17. That is, for a substantially straight strut, a partial unbalanced load tends to be exerted on the strut particularly on its basal side; however, providing the tapered sides facilitates effective load dispersion over the longitudinal direction of the strut 18. Accordingly, the struts 18 as a whole easily undergo elastic deformation (the struts 18 as a whole become pliable), so it is possible to improve the critical strength of the struts 18. Furthermore, since it is possible to improve the strength of the struts 18 by providing the struts 18 with the tapered sides, it is possible to improve the strength of the struts 18 without increasing the radial size of the casing 14. The load dispersion effect is likely to be reduced rapidly when the tapered side gradient is less than 3 degrees, and the strength of the struts at their tip (the side approaching the end carrier) is more likely to be decreased when the tapered side gradient exceeds 6 degrees; however, for the eccentric speed reducer 1, the tapered side gradient is set to at least 3 degrees and at most 6 degrees, so it is possible to achieve effective load dispersion, thereby maximizing the effect of increasing the strength of the struts as a whole.

Accordingly, this embodiment can provide an eccentric speed reducer 1 with which it is possible to achieve improved output torque without increasing the outer radial dimension of the casing 14.

Further, with the eccentric speed reducer 1, the outer circumference side 34 of each of the struts 18 is formed so as to have a small outer circumference side gradient of at least 0 degrees and less than 1 degree. Accordingly, also at the tip of the struts 18, the outer circumference side 34 is disposed further outside in the radial direction of the casing 14 in a direction in which the struts 18 narrow toward the end carrier 17 or in a direction straight toward the end carrier 17. This makes it possible to efficiently secure the cross-sectional area of a cross section perpendicular to the longitudinal direction of the struts 18 on the radial outside of the casing 14, also for a strut 18 provided with tapered sides. Accordingly, providing the tapered sides allows the struts 18 as a whole to easily undergo elastic deformation to achieve improved strength, and also to efficiently increase the cross-sectional area of the struts 18, making it possible to achieve a further increase in the strength of the struts 18. Furthermore, for the eccentric speed reducer 1, the outer circumference side gradient is set to less then 1 degree, so it is possible to inhibit a decrease in strength resulting from a decreased cross-sectional area, which tends to occur when the outer circumference side gradient is 1 degree or greater.

For the eccentric speed reducer 1, providing the struts 18 with the tapered sides and the above-mentioned outer circumference side 34 makes it possible to maintain a configuration with which a force exerted in the circumferential direction of the casing 14 is efficiently shared by the struts 18 as a whole, and also to increase the cross-sectional area, thus improving the strength in cross sections in the longitudinal direction of the struts 18. On the other hand, a force exerted in the radial direction of the casing 14 is relatively small compared to the force exerted in the circumferential direction of the casing 14, so there is no possibility that the struts 18 will be damaged by a force exerted in the radial direction of the casing 14 even when the outer circumference side gradient of the struts 18 is set to at least 0 degrees and less than 1 degree.

Further, with the eccentric speed reducer 1, the tapered sides are formed only at the bulging portions 37, which are the portions of the struts 18 on which the force in the circumferential direction of the casing 14 tends to be exerted. By providing the tapered sides only as the bulging portion sides 35 in this way, it is possible to efficiently disperse the load imposed on a portion where a load in the circumferential direction of the casing 14 tends to be exerted, and also to minimize the decrease of the cross-sectional area of the struts 18 that results from provision of the tapered sides, thus also efficiently inhibiting the reduction of rigidity of the struts 18 that changes depending on the cross-sectional area. Also, at least a basal portion 39 of the tapered sides are formed in portions at the bulging portions 37 of the struts 18 where the force in the circumferential direction of the casing 14 is more likely to be exerted, that is, basal portions that are continuous with the base carrier 16 on the side of the rotation supporting hole 31 with respect to the tangent R that is in contact in a bulging portion 37 with the peripheral edge of the rotation supporting hole 31 facing that bulging portion 37 and that passes through the center of the casing. This enables even more efficient load dispersion in a region including portions where a load in the circumferential direction of the casing 14 is most likely to be exerted. With these configurations, the eccentric speed reducer 1 minimizes the effect on the strength of the struts 18 by a decrease in the cross-sectional area, and also enables a force in the circumferential direction of the casing 14 to be dispersed with the struts 18 as a whole, thus allowing the struts 18 as a whole to easily undergo elastic deformation; accordingly, it is possible to improve the strength of the struts 18 even further.

Further, this embodiment has described the struts 18 each including the bulging portion sides 35 having a tapered side gradient of 5 degrees and the supporting hole-facing sides 36 having a supporting hole-facing side gradient of 2 degrees. By forming the struts 18 in this manner, a load exerted in the circumferential direction of the casing 14 can be more appropriately dispersed at portions where a side having an angle of 2 degrees and a side having an angle of 5 degrees are continuous. That is, by the tapered side gradient of the bulging portion sides 35 being set to 5 degrees and the supporting hole-facing side gradient being set to 2 degrees, it is possible to decrease the difference in loads shared by the bulging portion sides 35 and the supporting hole-facing sides 36 for the load in the circumferential direction of the casing 14, thus further improving the strength of the struts 18 as a whole.

Although an embodiment of the present invention is described above, the present invention is not limited to the above embodiment, and various modifications may be made within the scope recited in the claims. For example, the following modifications are possible.

(1) Although this embodiment was described taking, as an example, external gears in each of which three components are stacked, this need not be the case; it is possible to adopt external gears in each of which four or more components or two components are stacked. In that case, the present invention may be carried out by adopting a configuration in which each of the crankshafts is also provided with a number of cam portions corresponding to the number of components of each of the external gears.

(2) Although this embodiment was described taking, as an example, a case where three crankshafts are provided, this need not be the case; the present invention also can be carried out with a configuration in which four or more crankshafts are provided.

(3) Although this embodiment was described taking, as an example, a configuration in which the internal teeth on the inner circumference of the casing are formed as pin-shaped members, this need not be the case; the present invention can also be carried out with a configuration in which internal teeth integrally formed with the casing are provided, for example.

(4) Although this embodiment was described taking, as an example, struts in which tapered sides are formed only at the bulging portions, this need not be the case; tapered sides may be formed on sides other than those at the bulging portions. Although this embodiment was described taking, as an example, a case where a tapered side is formed at both of the pair of bulging portions, it is possible to adopt a configuration in which a tapered side is formed at only one of the pair of the bulging portions.

(5) Although this embodiment was described taking, as an example, struts in each of which the outer circumference side gradient having an outer circumference side gradient of at least 0 degrees and less than 1 degree and the supporting hole-facing side having a supporting hole-facing side of at least 1 degree and less than 3 degrees, this need not be the case; it is possible to adopt a configuration in which sides having an angle other than the above-described angles are provided as sides corresponding to the outer circumference sides and the supporting hole-facing sides.

INDUSTRIAL APPLICABILITY

The present invention is widely applicable as an eccentric speed reducer that includes crankshafts, external gears that eccentrically rotate by rotation of the crankshafts, a casing provided with internal teeth for meshing with external teeth of the external gears, and a carrier that rotatably supports the crankshafts.

The invention claimed is:

1. An eccentric speed reducer comprising:
 a casing having internal teeth provided on an inner circumference thereof;
 an external gear housed in the casing and having external teeth provided on an outer circumference thereof for meshing with the internal teeth;
 a plurality of crankshafts passing through holes formed in the external gear and disposed in a circumferential direction along the inner circumference of the casing, the crankshafts rotating to allow the external gear to eccentrically rotate;
 a base carrier that rotatably supports one end of the crankshafts;
 an end carrier that rotatably supports the other end of the crankshafts; and
 a plurality of struts disposed between the crankshafts in a circumferential direction along the inner circumference of the casing and formed integrally with the base carrier, the struts connecting the base carrier and the end carrier,
 wherein a tapered side is formed on at least part of a peripheral side surface of the struts, the tapered side extending in a tapered manner in the longitudinal direction of the struts in a direction that is oblique to a direction parallel to a center line passing through the casing so as to connect inner circumferential centers of the casing and in which the struts narrow toward the end carrier, and
 a tapered side gradient that is the angle of a direction in which the tapered side extends relative to the direction parallel to the center line is at least 3 degrees and at most 6 degrees.

2. The eccentric speed reducer according to claim 1, wherein an outer circumference side is formed on the peripheral side surface of the struts, the outer circumference side being located outside in a radial direction with respect to the inner circumference of the casing and in a circumferential direction along the inner circumference of the casing, and extending in the longitudinal direction of the struts in a direction in which the struts narrow toward the end carrier or in a direction straight toward the end carrier, and an outer circumference side gradient that is the angle of a direction in which the outer circumference side extends relative to the direction parallel to the center line is at least 0 degrees and less than 1 degree.

3. The eccentric speed reducer according to claim 2, wherein the base carrier is provided with rotation supporting holes that rotatably support one end of the crankshafts, the tapered side is formed in the struts at only a pair of bulging portions located so as to be outside in a radial direction with respect to the inner circumference of the casing and to bulge on both sides in a circumferential direction along the inner circumference of the casing or at only one of the pair of bulging portions, and, in the bulging portions in which the tapered side is formed, at least a basal portion of the tapered side that is continuous with the base carrier is formed on the side of the rotation supporting hole facing the bulging portions with respect to a tangent that is in contact with a peripheral edge of the rotation supporting hole and that passes through the inner circumferential centers of the casing.

4. The eccentric speed reducer according to claim 1, wherein the base carrier is provided with rotation supporting holes that rotatably support one end of the crankshafts, the tapered side is formed in the struts at only a pair of bulging portions located so as to be outside in a radial direction with respect to the inner circumference of the casing and to bulge on both sides in a circumferential direction along the inner circumference of the casing or at only one of the pair of bulging portions, and, in the bulging portions in which the tapered side is formed, at least a basal portion of the tapered side that is continuous with the base carrier is formed on the side of the rotation supporting hole facing the bulging portions with respect to a tangent that is in contact with a peripheral edge of the rotation supporting hole and that passes through the inner circumferential centers of the casing.

* * * * *